US006803937B2

(12) United States Patent
Hirooka et al.

(10) Patent No.: US 6,803,937 B2
(45) Date of Patent: Oct. 12, 2004

(54) PHOTOGRAPHIC PRINTER HAVING VARIED INTENSITIES OR OPTICAL MODULATION DATA FOR LASER LIGHT SOURCES

(75) Inventors: Jun Hirooka, Wakayama (JP); Yasutaka Kayama, Momoyama-cho (JP); Fumihiro Nakahara, Kibi-cho (JP); Hirofumi Hayashi, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 49 days.

(21) Appl. No.: 09/860,562

(22) Filed: May 21, 2001

(65) Prior Publication Data

US 2002/0008756 A1 Jan. 24, 2002

(30) Foreign Application Priority Data

May 23, 2000 (JP) ....................................... 2000-151142
May 23, 2000 (JP) ....................................... 2000-151143

(51) Int. Cl.$^7$ ................................................ B41J 2/435
(52) U.S. Cl. ....................................... 347/236; 347/246
(58) Field of Search ................................ 347/236, 237, 347/246, 247, 253, 254, 228, 239, 255, 225, 250; 358/3.06; 355/40, 401; 369/89

(56) References Cited

U.S. PATENT DOCUMENTS 4,583,128 A * 4/1986 Anderson, Jr. et al. ..... 358/302
4,782,365 A 11/1988 Takagi ......................... 355/38
4,812,861 A * 3/1989 Sasaki et al. ............... 347/246
5,053,805 A * 10/1991 Sakai et al. ................. 355/401
5,220,356 A * 6/1993 Yaginuma ................... 347/225
5,731,884 A * 3/1998 Inoue ........................ 358/3.06
6,061,526 A * 5/2000 Deguchi et al. .............. 369/89
6,108,024 A * 8/2000 Mitsui et al. ............... 347/250
6,121,993 A * 9/2000 Maekawara et al. ........ 347/236
6,133,984 A * 10/2000 Deguchi et al. .............. 355/40
6,191,867 B1 * 2/2001 Shor et al. .................... 358/1.9
6,496,280 B2 12/2002 Ishikawa et al. ............. 358/1.9

FOREIGN PATENT DOCUMENTS

JP 5-160497 A 6/1993
JP 5-188310 A 7/1993
JP 7-276681 * 10/1995 ............. B41J/2/32
JP 10-13595 A 1/1998
JP 11-052528 A 2/1999

* cited by examiner

*Primary Examiner*—Hai Pham
(74) *Attorney, Agent, or Firm*—Smith Patent Office

(57) ABSTRACT

In a photographic printer using a laser scanning unit for exposing a latent image corresponding to an image data on a sensitized surface of a photographic paper, intensities of the laser beams exposing the photographic paper are adjusted corresponding to a variation of an actual sensitivity of the photographic paper and deterioration of a developer with respect to nominal values of them. At least the intensities directly emitted from laser light sources, or values of optical modulation data for modulating the laser beams corresponding to the image data are varied. Alternatively, transmittances of optical elements such as polarizing beam splitters provided on optical paths are varied for adjusting the intensities of the laser beams.

5 Claims, 13 Drawing Sheets

3
11
11B
10
6
11A
2D
2C
2B
2
2A
20B
1
21B
20A
1
21A
1B
1B
4
C
5B
5
5C
5A
22
12
1A
100
5X
15
140
16
17

100
1A
B
5
CD
50
114
116
120
A
118
PMD
51
104R
104G
104B
106R
108R
106G
108G
106B
108B
110R
110G
110B
112R
112G
112B
105R
LD
LD
LD
105G
105B
MD
MD
MD
107R
107G
107B
PBD
PBD
PBD
109R
109G
109B
SENSOR
21A
SENSOR
21B
DENSITOMETER
22
DENSITY JUDGER
126
MAIN CONTROLLER
101
LASER POWER ADJUSTER
128
RAM
LUT
LUT
LUT
102
102A
102B
102C
PM
PM
PM
121R
121G
121B
POSITION SWITCHER
124
RANGE SELECTOR
123
JUDGER
122
MEMORY RENEWER
125
I/O UNIT
140
ROM
103

PRIOR ART

PHOTOGRAPHIC PRINTER HAVING VARIED INTENSITIES OR OPTICAL MODULATION DATA FOR LASER LIGHT SOURCES

BACKGROUND OF THE INVENTION

1. Field of the Invention

The present invention relates to a photographic printer using a laser scanning unit as an exposing apparatus for exposing a sensitized surface of a photographic paper.

2. Description of the Related Art

In recent years, a photographic printer using a laser scanning unit for exposing a latent image on a sensitized surface of a photographic paper is realized. In such the photographic printer, an image data taken by a digital camera or a scanner is used for exposing the latent image without using any film. For example, intensities of three laser beams of red, green and blue emitted from laser light sources are modulated corresponding to gradations of the image data. The modulated laser beams are scanned on the same scanning line on a sensitized surface of a photographic paper by the laser scanning unit. The photographic paper is conveyed in a direction perpendicular to the scanning line of the laser beams, so that the latent image corresponding to the image data is exposed on the sensitized surface of the photographic paper. When the photographic paper is developed, a visual image corresponding to the image data is formed on the photographic paper.

As conventionally known, each photographic paper has an inherent sensitivity, and the sensitivity of the photographic paper is varied corresponding to a condition such as a kind and deterioration of a developer. Thus, it is necessary to adjust the intensities of the laser beams corresponding to the combination of the sensitivity of the photographic paper and the condition of the developer.

The conventional photographic printer has a plurality of lookup tables corresponding to the combinations of the kinds of the photographic papers and the kinds of the developers. Each lookup includes a plurality of data corresponding to the relations between the gradations in the image data and the intensities of the laser beams. The data in the lookup table are referred to control the intensities of the laser beams so as to adjust the density of the visual image on the photographic paper at the same level with no relation to the kind of the photographic paper and the kind of the developer when the same image data is used. The data in the lookup table is called "optical modulation data" in the following description.

FIG. 14 shows an example of a γ-characteristic of a specific photographic paper developed by a specific developer. In FIG. 14, the abscissa designates a gradation of the image data having 4096 stages (0 to 4095) and the ordinate designates the density of the printed visual image actually exposed and developed by the photographic printer. Hereupon, it is assumed that the actual sensitivity of the photographic paper used in the photographic printing is higher than the nominal value of the sensitivity of the photographic paper. In such a case, even when the photographic paper is exposed by a laser beam having an intensity by which a density of the developed photographic paper is essentially to be 2.2, the actual density of the developed photographic paper will be 2.5 which is saturated. In other words, even when the intensity of the laser beam is controlled corresponding to the gradation of the image data, the density of the visual image on the photographic paper corresponding to the region between the point P1 and 4095 in the gradation will be saturated. Alternatively, when the actual sensitivity of the photographic paper used in the photographic printing is lower than the nominal value of the sensitivity of the photographic paper, a portion of the photographic paper exposed by the laser beam having the intensity corresponding to the density 2.5 does not satisfy the predetermined density. Thus, the gradation of the visual image on the photographic paper formed by the conventional photographic printer becomes rough, and the quality of the visual image becomes poor.

SUMMARY OF THE INVENTION

An object of the present invention is to provide a photographic printer using a laser scanning unit in which the intensities of laser beams used for exposing a photographic paper can be adjusted corresponding to variation of the actual sensitivity of the photographic paper with respect to a nominal value of the sensitivity thereof.

A photographic printer in accordance with the present invention comprises at least one laser light source for emitting a laser beam having a predetermined wavelength, an optical modulator for modulating the intensity of the laser beam emitted from the laser light source by using optical modulation data corresponding to an image data and a scanning mechanism for scanning the laser beam on a sensitized surface of a photographic paper. An intensity of the laser beam scanning on the photographic paper is adjusted corresponding to a combination of an actual sensitivity of the photographic paper and deterioration of a developer with respect to nominal values of them by selecting at least one of controlling a power of the laser light source, compensating the optical modulation data and providing an adjuster for adjusting transmittance of the laser beam when the laser beam passes therethrough on an optical path between the laser light source and the scanning mechanism.

By such a configuration, the sensitized surface of the photographic paper is exposed by the laser beam having a proper intensity with respect to the actual sensitivity of the photographic paper and the deterioration of the developer. Thus, gradation of a visual image formed on the photographic paper (or a photographic print) can be reproduces properly with no saturation. The quality of the photographic print can be increased.

DETAILED DESCRIPTION OF THE EMBODIMENT

First Embodiment

A first embodiment of the present invention is described. In the figures referred in the description, the names of the elements are abbreviated.

Figure 1:
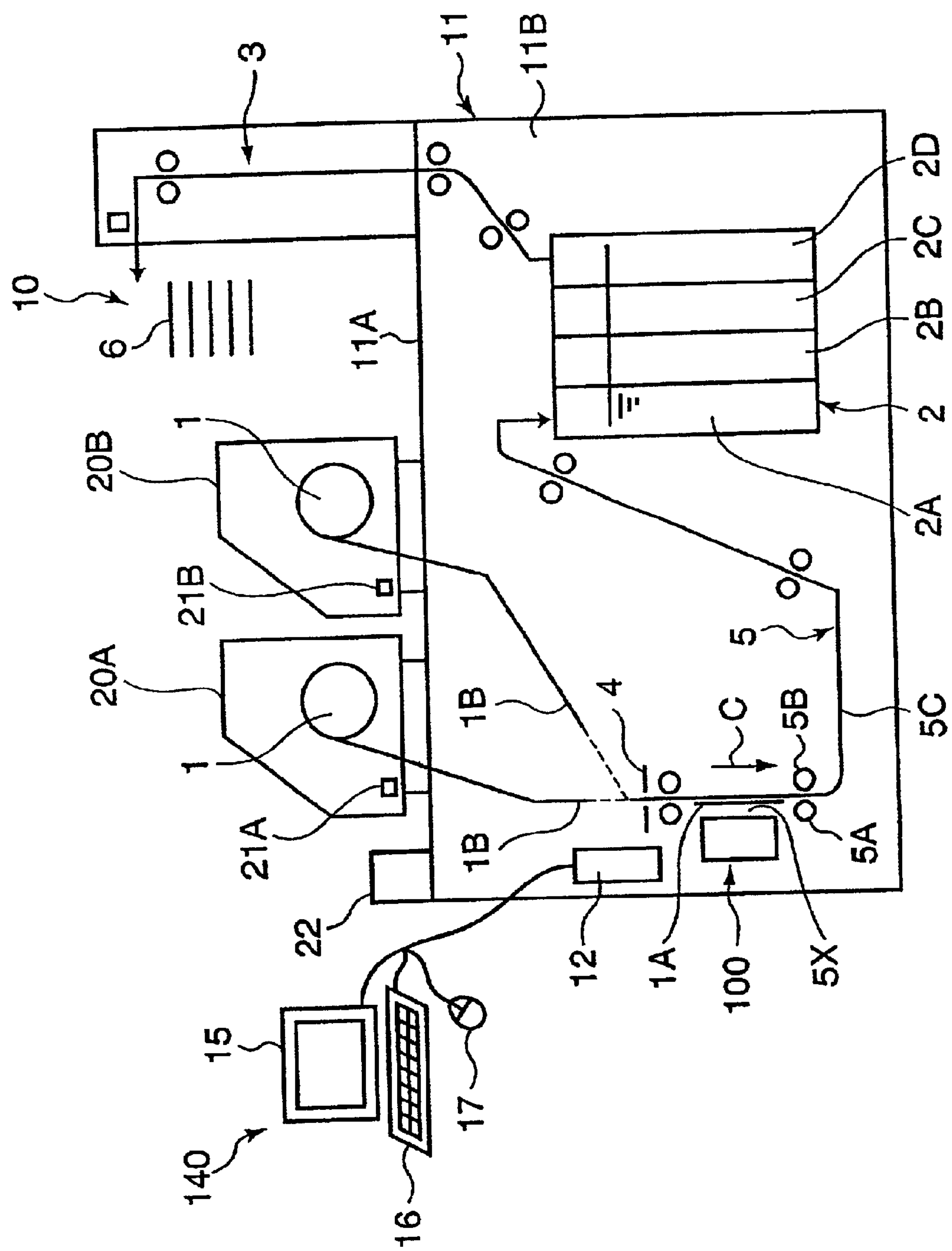
FIG. 1 is a sectional side view for showing a configuration of a photographic printer in a first embodiment of the present invention.

FIG. 1 schematically shows a configuration of a photographic printer using a laser scanning unit as an exposing apparatus in the first embodiment. The laser scanning unit 100 is disposed for facing an exposing position 5X on a conveyor 5 of a photographic paper 1 in an inside 11B of a housing 11 of the photographic printer 10. The conveyor 5 is configured by plural sets of a driving roller 5A and a trailing roller 5B and guide rails 5C. A plurality of, for example, two containers 20A and 20B respectively containing a roll of a photographic paper 1 are mounted on a top face 11A of the housing 11. Two sets of sensors 21A and 21B are provided in the containers 20A and 20B and on the top face 11A of the housing 11 respectively for sensing kinds of the photographic papers 1 contained in the containers 20A and 20B. Furthermore, a densitometer 22 for sensing a density of a test print is provided on the top face 11A of the housing 11.

The housing 11 and the containers 20A and 20B are dark boxes, so that ends 1B of the photographic papers 1 are respectively introduced into the inside 11B of the housing 11 from the containers 20A and 20B. The photographic paper 1 is cut into a predetermined size by a cutter 4 in the inside 11B of the housing 11. Hereinafter, the photographic paper 1 cut into the predetermined size is called "photographic paper sheet 1A". The photographic paper sheet 1A is conveyed toward the exposing position 5A and a developing unit 2 by the conveyor 5 in the inside 11B of the housing 11.

The developing unit 2 has a plurality of tanks 2A to 2D respectively containing solutions of a developer, a fixer, a bleach and a stabilizer. When the photographic paper sheet 1A exposed by the laser scanning unit 100 is conveyed through the developing unit 2, a latent image is developed and a visual image is formed on a sensitized surface of the photographic paper sheet 1A. The developed photographic paper 1A is dried by a drying unit 3 and exhausted from the inside 11A of the housing 11. The developed photographic paper sheets 1A are piled on a sorter 6 provided on the top face 11A of the housing 11.

The photographic printer 10 further comprises a controller 12 provided in the housing 11, a monitor display 15 such as a CRT (Cathode Ray Tube), a key board 16 and a mouse 17 by which a operator can input a command and/or data and know predetermined information corresponding to the development of the photographic paper 1. The monitor display 15, the key board 16 and the mouse 17 configures an I/O (input/output) unit 140. It is possible to dispose the I/O unit 140 independently from the housing 11 of the photographic printer 10. Alternatively, it is possible to integrate the I/O unit 140 with the housing 11 of the photographic printer 10.

Figure 2:
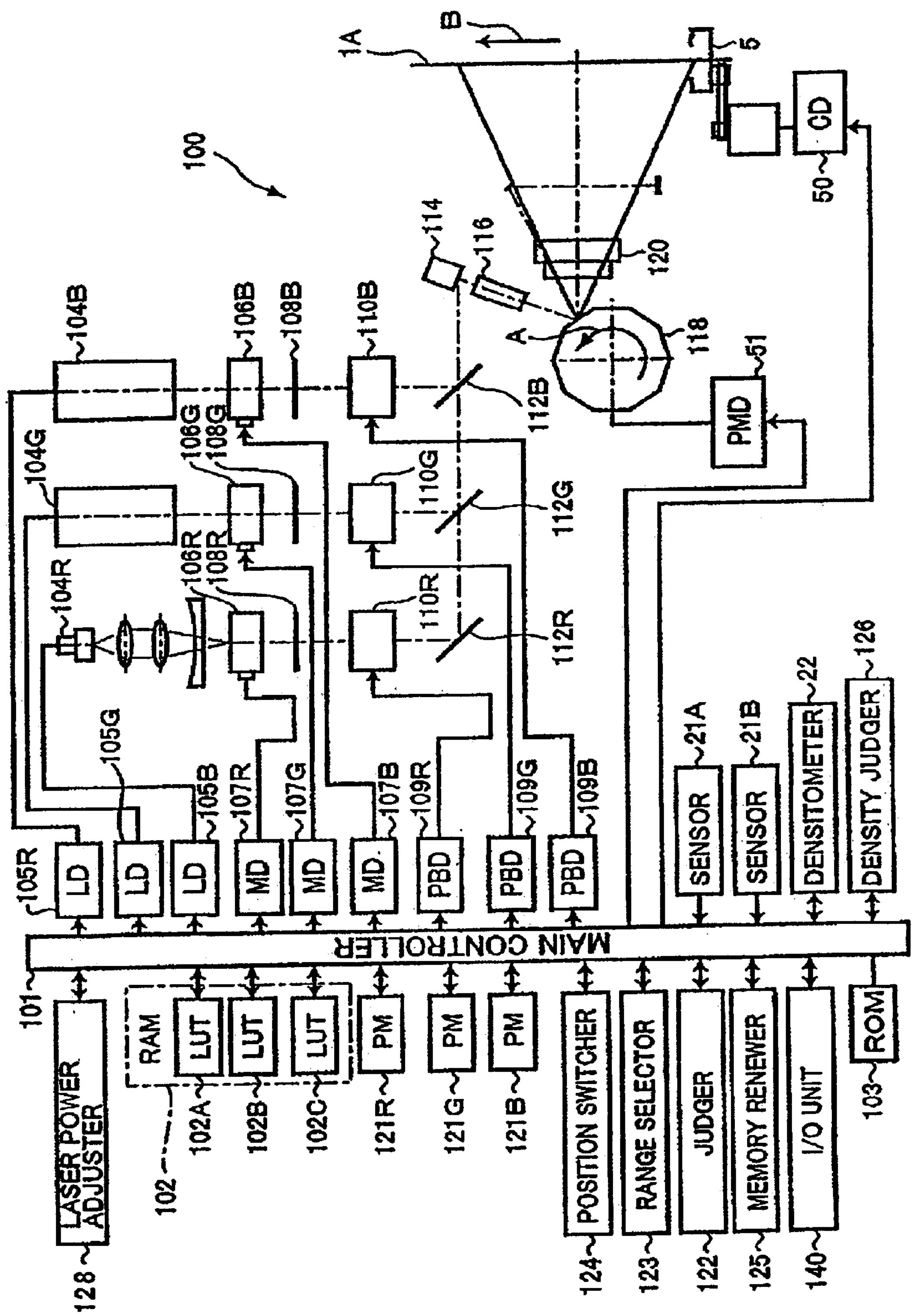
FIG. 2 is a block diagram for showing a configuration of a laser scanning unit of the photographic printer in the first embodiment.

FIG. 2 shows a block diagram of the laser scanning unit 100 in the first embodiment. The laser scanning unit 100 comprises three laser light sources 104R, 104G and 104B respectively emitting laser beams of three principal colors such as red, green and blue. The laser light source 104R includes a semiconductor laser for emitting a red laser beam having a wavelength of 680 nm. The laser light source 104G includes the semiconductor laser and a secondary high frequency generator for converting the laser beam emitted from the semiconductor laser to a green laser beam having a wavelength of 532 nm. The laser light source 104B includes the semiconductor laser and a secondary high frequency generator for converting the laser beam emitted from the semiconductor laser to a blue laser beam having a wavelength of 473 nm. As can be seen from FIG. 2, the laser light sources 104R, 104G and 104B respectively includes a set of collimator lenses (two sets with respect to the green and blue laser light sources 104G and 104B are not illustrated).

Furthermore, three sets of an acousto-optic modulators 106R, 106G or 106B, a slit plate 108R, 108G or 108B, and a cube shaped polarizing beam splitters 110R, 110G or 110B are respectively provided in front of the laser light sources 104R, 104G and 104B. Furthermore, four mirrors 112R, 112G, 112B and 114 and a lens 116 are provided on optical paths of the laser beams emitted from the laser light sources 104R, 104G and 104B for reflecting the laser beams toward a polygon mirror 118.

The mirror 112R is a total reflection mirror for reflecting the red laser beam from the polarizing beam splitter 110R toward the mirror 112G. The mirror 112G is a half mirror for passing the red laser beam and reflecting the green laser beam from the polarizing beam splitter 110G toward the mirror 112B. The mirror 112B is a half mirror for passing the red and green laser beams and reflecting the blue laser beam from the polarizing beam splitter 110B toward the mirror 114. By such a configuration, the red, green and blue laser beams are superimposed.

The polygon mirror 118 is rotated, for example, in a direction shown by arrow "A" at a predetermined constant rotation speed for reflecting the laser beams in a predetermined direction. An fθ lens 120 is disposed in front of the polygon mirror 118. The laser beams are deflected by the rotation of the polygon mirror 118, the fθ lens 120 in the main scanning direction shown by arrow B. Since the photographic paper sheet 1A is conveyed in a direction perpendicular to the paper sheet of FIG. 2 by the conveyor 5, so that a latent image corresponding to an image data used for modulating the laser beams is exposed on the sensitized surface of the photographic paper sheet 1A.

In the laser scanning unit 100, the intensities of the laser beams are maintained in the predetermined levels when they are emitted from the laser light sources 104R, 104G and 104B. The intensities of the laser light beams emitted from the laser light sources 104R, 104G and 104B are respectively modulated by the acousto-optic modulators 106R, 106G and 106B corresponding to the gradations of components of red, green and blue included in the image data. Furthermore, the intensities of the laser beams passing through the acousto-optic modulators 106R, 106G and 106B are adjusted by the polarizing beam splitters 110R, 110G and 110B corresponding to the variation of the sensitivity of the photographic paper 1 and so on. Detailed configuration and principle of the polarizing beam splitters 110R, 110G and 110B will be described below.

The laser scanning unit 100 further comprises a main controller 101 such as CPU (Central Processing Unit) for controlling whole operations of the laser scanning unit 100, a first memory 102 such as a RAM (Random Access Memory) temporarily for memorizing several data and a second memory 103 such as a ROM for memorizing a control program of the laser scanning unit 100, which are included in the controller 12.

A conveyor driver (CD) 50 and a polygon mirror driver (PMD) 51 are connected to the main controller 101 respectively for controlling the rotation of the polygon mirror 118 and for controlling the conveyance of the photographic paper sheet 1 by the conveyor 5.

A laser power adjuster 128 is connected to the main controller 101 by which the intensities of the laser beams emitted from the laser light sources 104R, 104G and 104B are respectively adjusted between predetermined limits. Three laser drivers (LD) 105R, 105G and 105B are provided between the main controller 101 and the laser light sources 104R, 104G and 104B for maintaining the intensities of the laser beams emitted from the laser light sources 104R, 104G and 104B at predetermined levels corresponding to the adjustment by the laser power adjuster 128.

Three modulator drivers (MD) 107R, 107G and 107B are respectively provided between the main controller 101 and the acousto-optic modulators 106R, 106G and 106B for modulating the intensities of the laser beams passing through the acousto-optic modulators 106R, 106G and 106B corresponding to the gradations of the image data with respect to principal colors of red, green and blue. Detailed configuration of and principle of the modulation by the acousto-optic modulators 106R, 106G and 106B will be described below.

Three polarizing beam splitter drivers (PBD) 109R, 109G and 109B are respectively provided between the main controller 101 and the polarizing beam splitters 110R, 110G and 110B. Furthermore, three position memories (PM) 121R, 121G and 121B respectively for memorizing rotation position of the polarizing beam splitters 110G, 110G and 110B are connected to the main controller 101. Detailed configuration of and principle of the polarization by the polarizing beam splitters 110R, 110G and 110B will be described below.

A judger 122, a range selector 123, a position switcher 124 and a memory renewer 125 are further connected to the main controller 101. The judger 122 judges whether the combination of the photographic paper and the developer is changed from the initial combination of them or the combination in the last test printing or not. The range selector 123 selects a range during which the intensities of the laser beams can be controlled. For example when the range is selected between 50% to 100% by the range selector 123, the intensities of the laser beams passing through the polarizing beam splitters 110R, 110G and 110B can be controlled between 50% to 100% with respect to the intensities of the laser light beams passing through the acousto-optic modulators 106R, 106G and 106B. Alternatively, when the range is selected between 0% to 100%, the intensities of the laser beams passing through the polarizing beam splitters 110R, 110G and 110B can be controlled between 0% to 100%. The position switcher 124 switches the rotation positions of the polarizing beam splitters 110R, 110G and 110B. The memory renewer 125 selects a lookup table used in the photographic printing among the lookup tables memorized in the first memory 102 and renews the lookup table when the proper density cannot be obtained by using the selected lookup table.

Still furthermore, the above-mentioned sensors 21A and 21B, the densitometer 22 and a density judger 126 are connected to the main controller 101 respectively for sensing the kinds of the photographic papers 1 contained in the containers 20A and 20B, and for sensing densities of a test print exposed and developed by the photographic printer 10 for evaluating the combination of the sensitivity of the photographic paper 1 and the developer.

The first memory 102 memorizes a plurality of lookup tables (LUT) 102A, 102B, 102C . . . corresponding to the combinations of the kinds of the photographic papers and the developers which can be used in the photographic printer 10. The lookup tables 102A, 102B, 102C . . . respectively have a sufficient capacity for memorizing twelve bit data. The lookup tables 102A, 102B, 102C . . . renewably memorize a set of the optical modulation data corresponding to 4096 (0 to 4095) stages of gradation of the image data with respect to each of the principal colors of red, green and blue. The optical modulation data in the lookup tables 102A, 102B, 102C . . . will be used for modulating the laser beams by the acousto-optic modulators 106R, 106G and 106B. Each optical modulation data is memorized at the address having the same number as that of the stage of the gradation in each lookup tables 102A, 102B, 102C . . . . Contents of the lookup tables 102A, 102B, 102C . . . are generally prepared by the vendor of the photographic printer with respect to all the combination of the kinds of the photographic papers and the developers which can be obtained in the market, and supplied to the user of the photographic printer by a recording medium such as a CD-ROM.

In the present invention, the intensities of the laser beams scanning on the sensitized surface of the photographic paper sheet 1A are adjusted to be proper levels corresponding to the variation of the actual sensitivity of the photographic paper and the developer. For example, the actual sensitivity of the photographic paper is generally varied in a range about ±10% with respect to with respect to the nominal value of the sensitivity of the photographic paper. On the other hand, the developer is filled in the tanks 2A of the developing unit 2, it is occasionally changed. Thus, the following description will be described for compensating the variation of the sensitivity of the photographic paper, and especially it is assumed that the actual sensitivity of the photographic paper is higher than the nominal value of the sensitivity thereof.

In the above-mentioned laser scanning unit 100 in the first embodiment, there are several methods for compensating the intensities of the laser beams. First, the intensities of the laser beams emitted from the laser light sources 104R, 104G and 104B are adjusted by the laser drivers 105R, 105G and 105B. In the first case, the optical modulation data memorized in the lookup tables 102A, 102B, 102C . . . and the rotation positions of the polarizing beam splitters 110R, 110G and 110B are not changed. Second, the values of the optical modulation data memorized in the lookup tables 102A, 102B, 102C . . . are varied so as to reduce the intensities of the laser beams passing through the acousto-optic modulators 106R, 106G and 106B. In the second case, the intensities of the laser beams emitted from the laser light sources 104R, 104G and 104B and the rotation positions of the polarizing beam splitters 110R, 110G and 110B are not changed. Third, the rotation positions of the polarizing beam splitters 110R, 110G and 110B are controlled so as to reduce the intensities of the laser beams passing through the polarizing beam splitters 110R, 110G and 110B. In the third case, the intensities of the laser beams emitted from the laser light sources 104R, 104G and 104B and the optical modulation data memorized in the lookup tables 102A, 102B, 102C . . . are not changed. Fourth, at least two of the above-mentioned first to third cases are combined.

Figure 3:
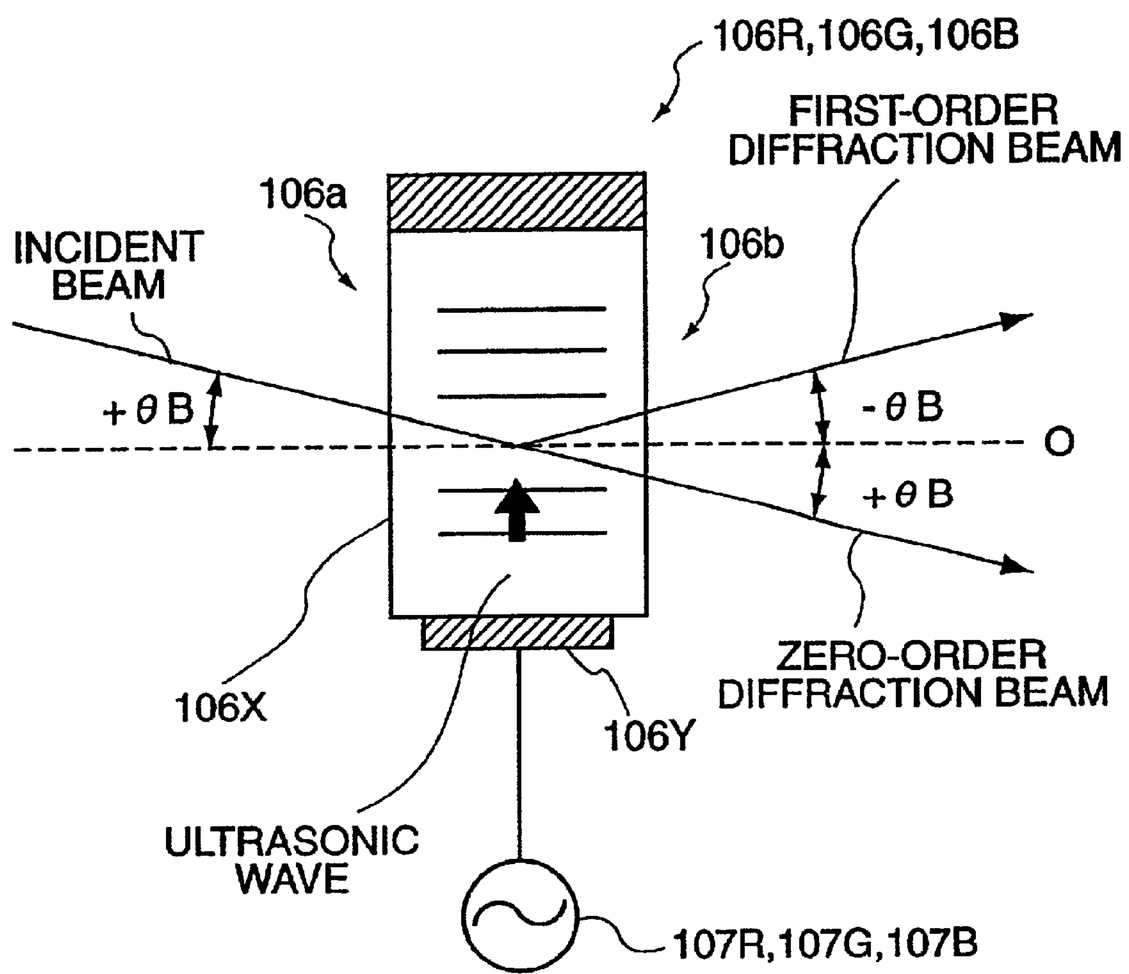
FIG. 3 is a schematic sectional view for showing a configuration and principle of an acousto-optic modulator used in the first embodiment.

Subsequently, the detailed configuration of and the principle of the modulation by the acousto-optic modulators 106R, 106G and 106B are described with reference to FIG. 3. Each acousto-optic modulator 106R, 106G or 106B is configured by an acousto-optic element 106X, an ultrasonic transducer 106Y, the modulator driver 107R, 107G or 107B, and so on. The acousto-optic element 106X is, for example, made of a glass such as tellurite glass or silica glass, and has a cubic shape. The ultrasonic transducer 106Y is fixed on a face perpendicular to an incident face 106*a* and an exit face 106*b* of the laser beams in the acousto-optic element 106X. Total sizes of the modulator 106R, 106G or 106B except the driver 107R, 107G or 107B is about 2 cm (longitude)×2 cm (lateral)×1 cm (height).

When the ultrasonic transducer 106Y is driven by driving signals supplied from the driver 107R, 107G or 107B, periodic variation of refractive index serving as a diffraction grating occurs in the acousto-optic element 106X. When the laser beam having an incident angle$+\theta_B$ with respect to the normal "O" of the incident plane 106*a* of the acousto-optic element 106X enters into the modulator 106R, 106G or 106B, the laser beam is diffracted by Bragg reflection of the diffraction grating generated by the ultrasonic vibration. A zero-order diffraction beam (direct beam) exits from the exit face 106*b* with an exit angle $+\theta_B$, and a first-order diffraction beam exits from the exit face 106*b* with an exit angle $-\theta_B$. The zero-order diffraction beam is shielded by the wall of the slit plate 108R, 108G or 108B, so that the zero-order diffraction beam cannot enter into the polarizing beam splitter 110R, 110G or 110B. On the other hand, the first-order diffraction beam can pass through the slot of the slit plate 108R, 108G or 108B, so that the first-order diffraction beam can enter into the polarizing beam splitter 110R, 110G or 110B.

Figure 4:
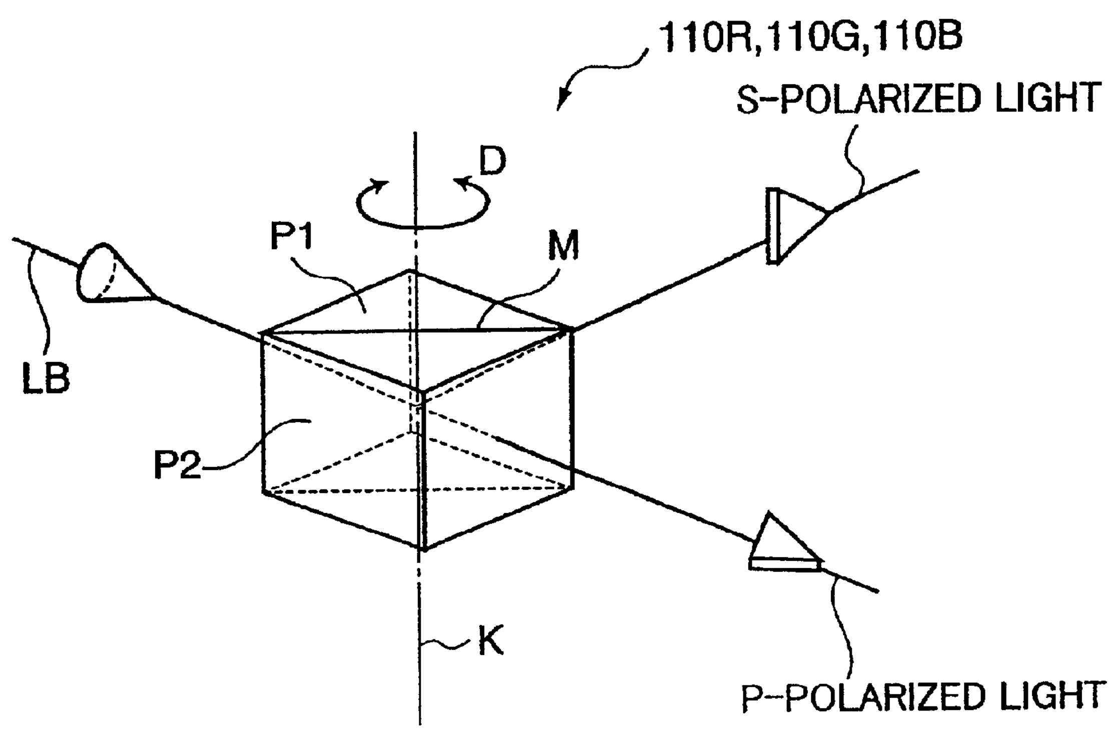
FIG. 4 is a perspective view for showing a configuration and principle of a polarizing beam splitter used as an adjuster of the intensity of the laser beam in the first embodiment.

Furthermore, the detailed configuration of and the principle of the polarization by the polarizing beam splitters 110R, 110G and 110B are described with reference to FIG. 4. Each polarizing beam splitter 110R, 110G or 110B is configured by two rectangular prisms P1 and P2 which are adhered in a manner to face slant faces of them each other. A dielectric polarizing film "M" is formed on one of the slant faces of the prisms P1 and P2. Total sizes of the polarizing beam splitter 110R, 110G or 110B is about 1 cm (longitude)×1 cm (lateral)×1 cm (height).

The laser beam LB emitted from each laser light source 104R, 104G or 104B has a circular section of a diameter about 10082 and includes a P-polarized light component and an S-polarized light component. The laser light beam is expanded to be predetermined sectional shape by a beam expander, and so on disposed on the optical path. When the laser beam LB passes through the polarizing beam splitter 110R, 110G or 110B, the laser beam LB is split into the S-polarized light and the P-polarized light by the reflection and transparency of the dielectric polarizing film "M".

The polarizing beam splitter 110R, 110G or 110B is rotated in a direction shown by arrow "D" by a driving motor (not shown in the figure) in a manner so that the dielectric polarizing film "M" is rotated around an axis "K" parallel to the contacting plane of the slant faces. When the dielectric polarizing film "M" is rotated, the reflection angle of the dielectric polarizing film "M" with respect to the laser beam LB is varied, so that the ratio of the component of the S-polarized light reflected by the dielectric polarizing film "M" is varied corresponding to the reflection angle. In other words, the component of the laser beam passing through the dielectric polarizing film "M" is varied corresponding to the reflection angle of the dielectric polarizing film "M". The ratio of extinction with respect to the P-polarized light becomes about 1/50 and that the ratio of extinction with respect to the S-polarized light becomes about 1/400. The intensities of the laser beams passing through the polarizing beam splitters 110R, 110G and 110B with respect to the intensities of the laser beams passing through the acousto-optic modulators 106R, 106G and 106B can be controlled between, for example, 50% to 100%. As mentioned above, the actual sensitivity of the photographic paper is varied in a range about ±10% with respect to the nominal value of the sensitivity of the photographic paper, so that the range of the adjustment by the polarizing beam splitters 110R, 110G and 110B will be relatively narrower.

Figure 5A:
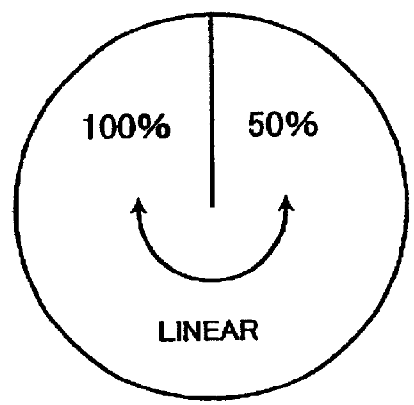
FIGS. 5A to 5C are graphs respectively for showing examples of adjustment of intensities of laser beams by polarizing beam splitters used as adjusters in the first embodiment.
Figure 5B:
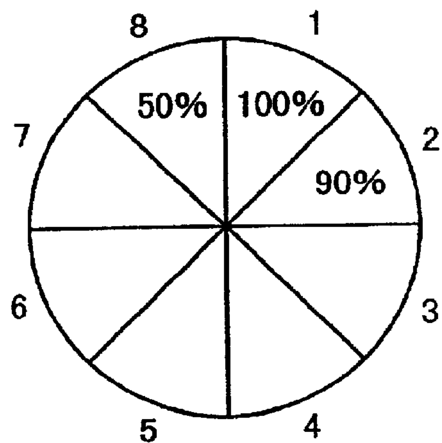
Figure 5C:
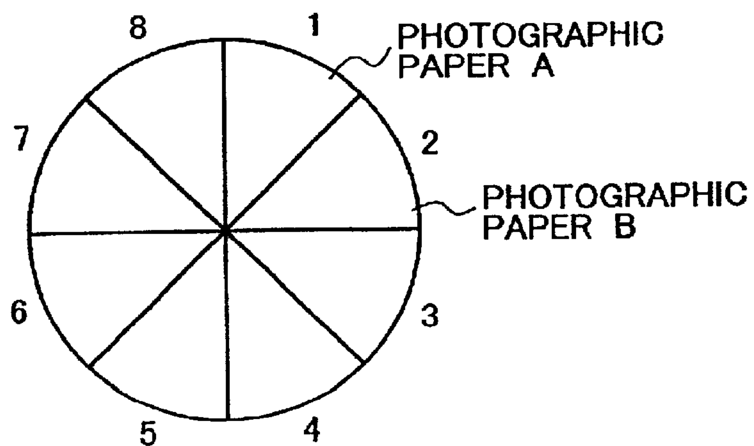

FIGS. 5A to 5C respectively show examples of patterns for controlling the intensity of the laser beams by the polarizing beam splitters 110R, 110G and 110B. FIG. 5A shows a first example by which the intensities of the laser beams passing through the polarizing beam splitters 110R, 110G and 110B are linearly varied between 50% to 100% with respect to the intensities of the laser beams passing through the acousto-optic modulators 106R, 106G and 106B. FIG. 5B shows a second example by which the intensities of the laser beams passing through the polarizing beam splitters 110R, 110G and 110B are gradually varied by 10% between 50% to 100% with respect to the intensities of the laser beams passing through the acousto-optic modulators 106R, 106G and 106B. FIG. 5C shows a third example by which the intensities of the laser means passing through the polarizing beam splitters 110R, 110G and 110B are directly varied corresponding to the kinds of the photographic papers.

In this embodiment, the polarizing beam splitter 110R, 110G and 110B are used as the adjuster of the intensities of the laser beams, so that the control pattern will be similar to the first example shown in FIG. 5A. When another optical element such as an ND filter or a polarizer is used as the adjuster of the intensities of the laser beams, another control pattern can be realized.

Subsequently, sensing of the kinds of the photographic paper is described with reference to FIG. 6. As mentioned above, the photographic printer 10 in the first embodiment can mount a plurality of containers 20A, 20B . . . respectively containing different kinds of the photographic papers 1, for example, having different widths such as 10 inch and 6 inch, and so on. Since the portions of the sensors 21A and 21B in the containers 20A and 20B are previously set corresponding to the kinds of the photographic papers 1, the kinds of the photographic papers 1 contained in the containers 20A and 20B can automatically be sensed by the sensors 21A and 21B when the containers 20A and 20B are mounted on the photographic printer 10. The sensitivities of the photographic papers are generally different corresponding to the size, kind, supplier and so on.

Figure 6:
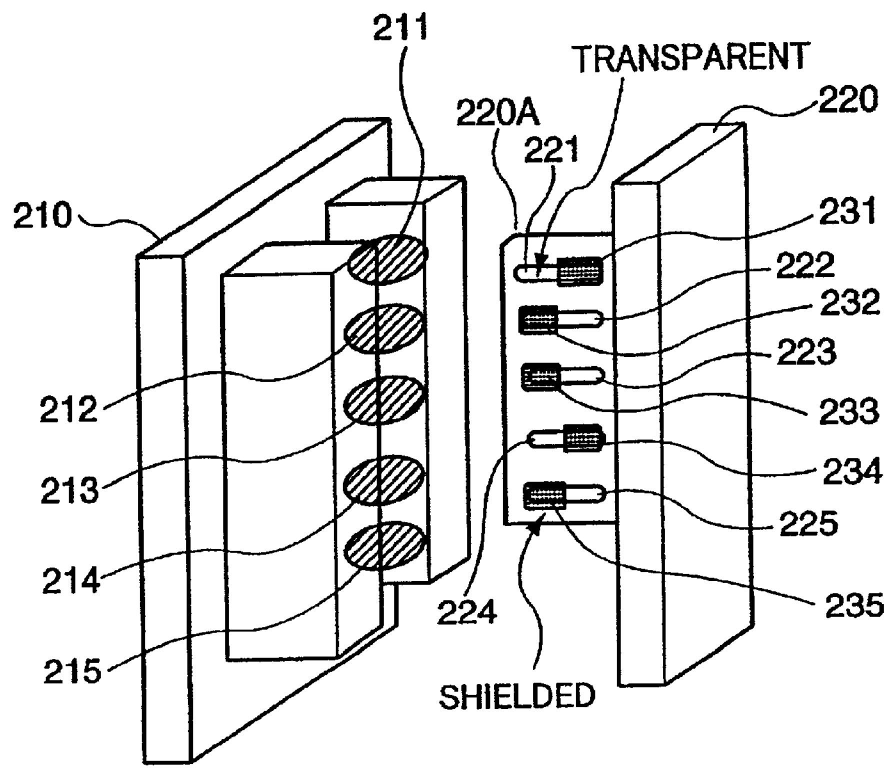
FIG. 6 is a perspective view for showing a configuration of a sensor for sensing a kind of a photographic paper used in the photographic printer in the first embodiment.

FIG. 6 shows a configuration of the sensors 21A and 21B. A plurality of, for example, five sets of photo-interrupters 211 to 215 configured by arrays of light emitting elements and photo sensing elements are arranged at a predetermined pitch on a portion 210 of the sensors 21A and 21B on the housing 11. On the other hand, a plurality of, for example, five sets of slits 221 to 225 and sliders 231 to 235 are arranged at the predetermined pitch on a board 220A provided on a portion 220 of the sensors 21A and 21B on the container 20A and 20B. When the containers 20A and 20B are mounted on the housing 11 of the photographic printer 10, the board 220A is disposed between the light emitting elements and the photo sensing elements of the photo-interrupters 211 to 215. Light beams emitted from the light emitting elements are shielded by, for example, the sliders 232, 233 and 235. In this example, when the output level of the photo sensing elements receiving the light beam passing through the slits 221 and 224 is set to be "1" and the output level of the photo sensing elements not receiving the light beam shielded by the sliders 232, 233 and 235 is set to be "0", a five bit data "10010" can be obtained by the sensor 20A or 20B. For example, a kind of the photographic paper, a width of the photographic paper and so on are designated by the combination of these five bits data. By such a configuration, the kinds of the photographic papers on the market can be distinguished by the five bit data. All the data corresponding to the kinds of the photographic papers on the market are previously memorized in the first memory 102. The five bit data sensed by the sensors 21A and 21B are used for judging whether the combination of the kinds of the photographic paper and the developer is changed or not by the judger 122.

Subsequently, the test printing by the photographic printer in the first embodiment is described. In the test printing, a sample image data corresponding to a gray test chart uniformly colored by the same gray is used for exposing the sensitized surface of the photographic paper sheet 1A. The sensitized surface of the photographic paper sheet 1A is exposed by the laser beams of red, green and blue by stopping the polarizing beam splitters 110R, 110G and 110B at positions by a predetermined rotation angle. The exposed photographic paper sheet 1A is developed by the specific developer, and the densities of respective regions corresponding to the rotation positions of the polarizing beam splitters 110R, 110G and 110B on the developed photographic paper sheet 1A are sensed by the densitometer 22. The density judger 126 compares the densities of the sensed densities of the developed photographic paper sheet 1A with a predetermined data of the densities, and judges whether the sensed densities are proper or not.

Figure 7:
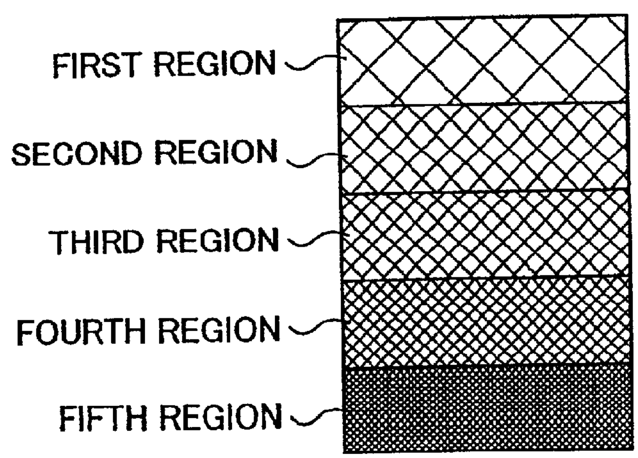
FIG. 7 is a chart for showing an example of distribution of densities.

An example of the densities of the regions on the photographic paper sheets 1A is shown in FIG. 7. In this example, the polarizing beam splitters 110R, 110G and 110B are respectively stopped at five rotation positions at which the transmittance of the laser beams passing through the polarizing beam splitters 110R, 110G and 110B become 0%, 25%, 50%, 75% and 100%, so that the densities in the first to fifth regions are gradually increased. When the densities in the first to fifth regions are sensed by the densitometer 22, it is assumed that the density in the fourth region is proper or sufficient but the density in the third region is improper or insufficient. In this case, the rotation positions of the polarizing beam splitters 110R, 110G and 110B at which the fourth region is exposed is selected. Alternatively, when no density in the first to fifth regions is judged proper or sufficient, the lookup table used in the photographic printing operation is renewed by the memory renewer 125, and the test printing will be re-executed by resetting the rotation positions of the polarizing beam splitters 110R, 110G and 110B.

The intensities of the laser beams passing through the polarizing beam splitters 110R, 110G and 110B can be continuously varied. On the other hand, since the length of the photographic paper sheet 1A is finite, the number of the regions exposed on the same photographic paper sheet 1A is also finite. Thus, the variation of the rotation positions of the polarizing beam splitters 110R, 110G and 110B are roughly selected, at first. Subsequently, the variation of the rotation positions of the polarizing beam splitters 110R, 110G and 110B are gradually narrowed. By repeating the test printings, it is possible to increase the accuracy for selecting the rotation positions of the polarizing beam splitters 110R, 110G and 110B, at which the proper or sufficient density can be obtained.

When the rotation positions of the polarizing beam splitters 110R, 110G and 110B, at which the proper or sufficient density are obtained, the rotation positions are temporarily memorized in the first memory 101 as the initial rotation positions of the polarizing beam splitters 110R, 110G and 110B with the data corresponding to the kinds of the photographic paper 1 and the developer. When the initial values of the rotation positions of the polarizing beam splitters 110R, 110G and 110B are previously memorized in the first memory when the photographic printer 10 is shipped from the vendor, the new rotation positions of the polarizing beam splitters 110R, 110G and 110B obtained by the test printing are renewed as the initial rotation positions.

After the test printing, it is considered that the kind of the developer is rarely changed, so that the kind of the developer is fixed. The rotation positions of the polarizing beam splitters 110R, 110G and 110B with respect to the kinds of the photographic papers 1 contained in the containers 20A and 20B are memorized in the position memories 121R, 121G and 121B with the data of the kinds of the photographic papers 1. In the actual photographic printing after the test printing, the data of the rotation positions of the polarizing beam splitters 110R, 110G and 110B are read out from the position memories 121R, 121G and 121B corresponding to the sensing data of the kinds of the photographic papers 1 by the sensors 21A and 21B. In this embodiment, the densitometer 22 is used for sensing the densities of the test print. It, however, is possible to use a colorimeter for sensing the density of the test print.

Figure 8:
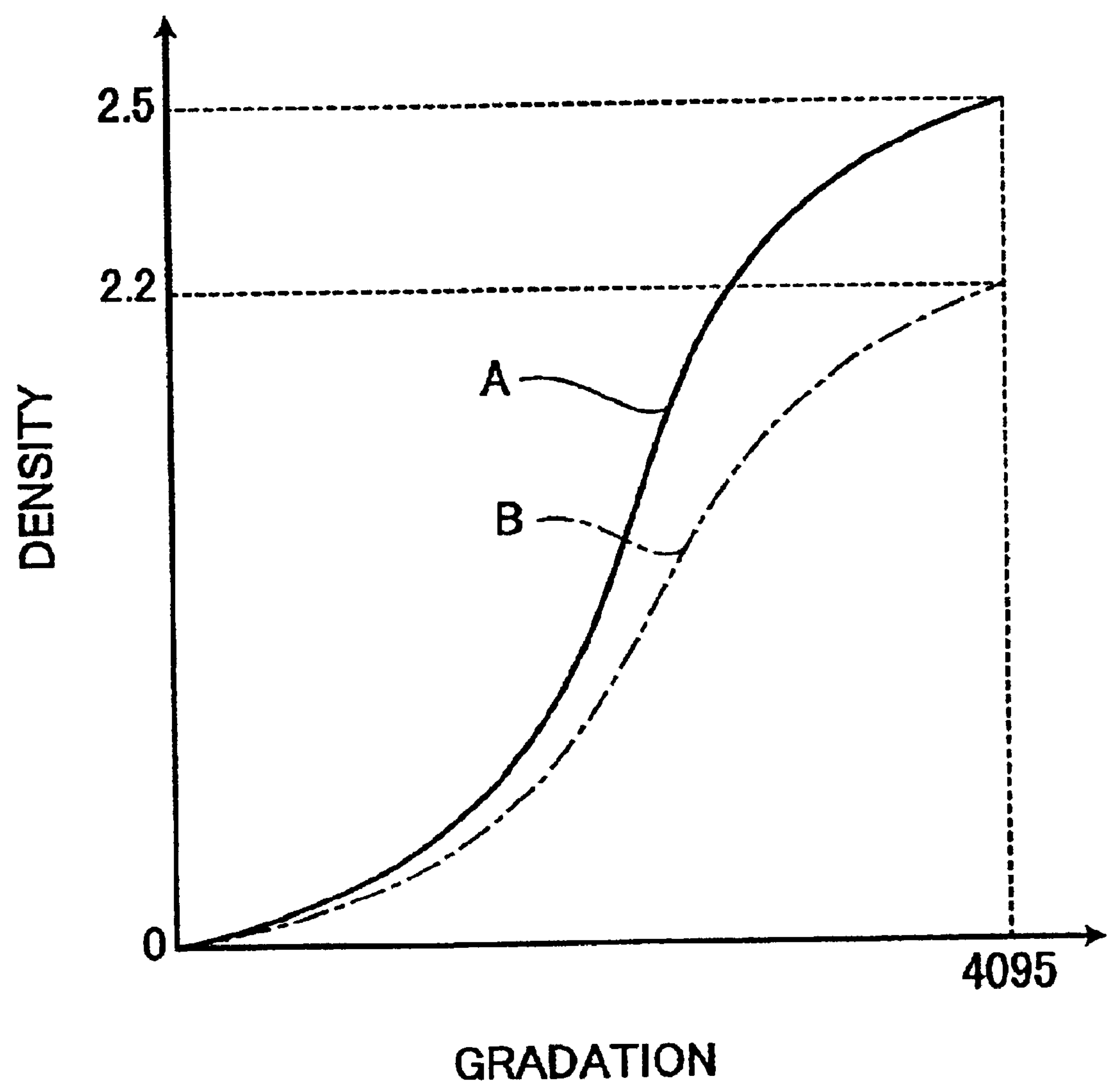
FIG. 8 is a graph for showing examples of γ-characteristic curves of a photographic paper before and after the compensation.

The renewal of the lookup table is described with reference to FIG. 8. In FIG. 8, a characteristic curve "A" illustrated by the solid line shows the example of the γ-characteristic of the specific photographic paper developed by the specific developer which is the same as that described in the prior art. A characteristic curve "B" illustrated by one dotted chain line shows a compensated γ-characteristic by the renewed lookup table. In FIG. 8, the abscissa designates a gradation of the image data having 4096 stages (0 to 4095) and the ordinate designates the density of the printed visual image actually exposed and developed by the photographic printer.

In the renewed lookup table, the value of the optical modulation data with respect to each gradation is reduced, for example, by multiplying a predetermined coefficient such as 2.2/2.5. Thus, the intensity of the laser light beams passing through the acousto-optic modulators 106R, 106G and 106B are reduced, since the amplitude of the driving signals of the ultrasonic transducer 106Y of the acousto-optic modulators 106R, 106G and 106B are controlled by the optical modulation data memorized in the renewed lookup table.

Figure 9:
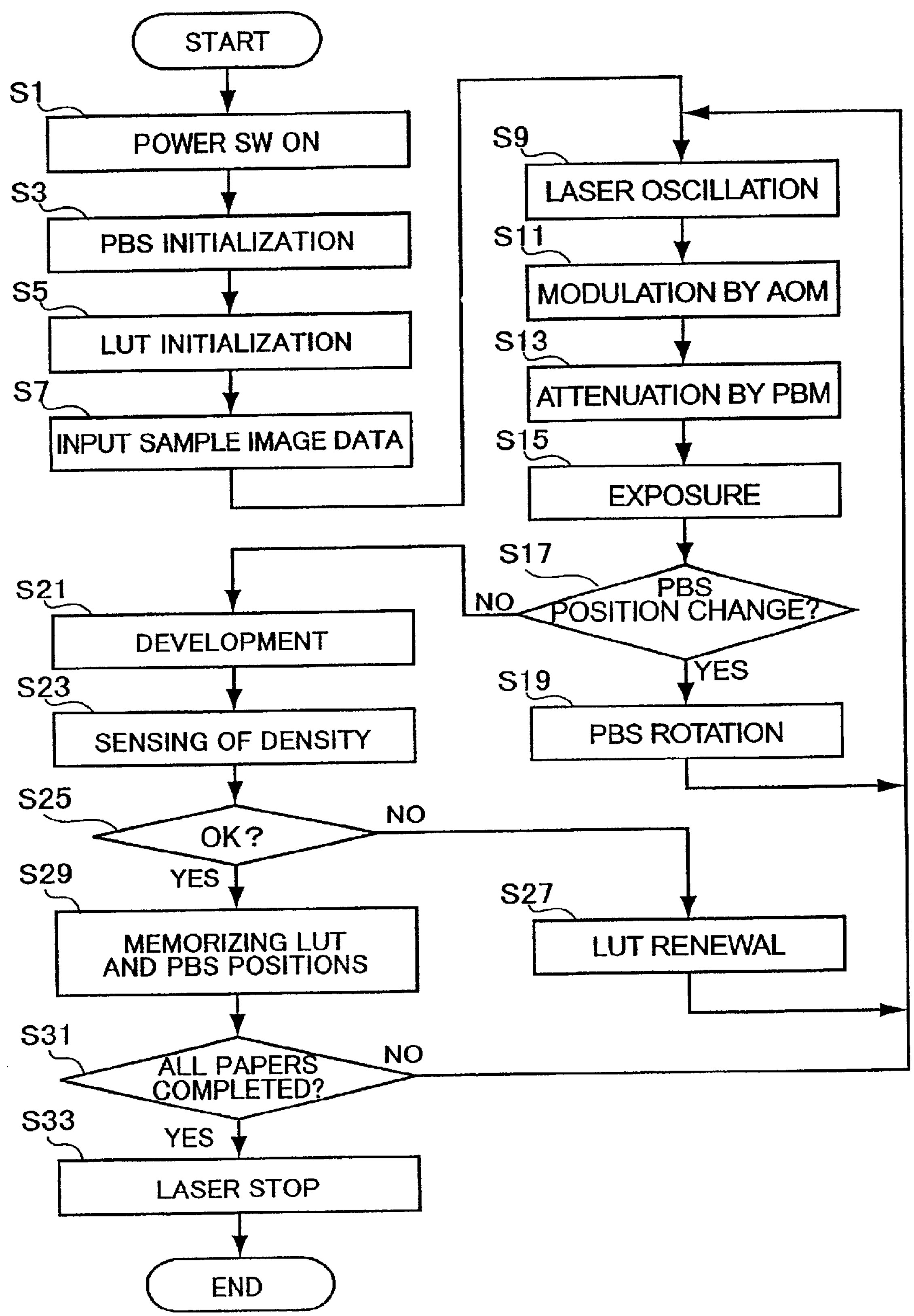
FIG. 9 is a flowchart for showing steps of test printing operation by the photographic printer in the first embodiment.

Subsequently, the test printing operation in the photographic printer 10 in the first embodiment is described with reference to a flowchart shown in FIG. 9. The test printing operation is generally executed at an everyday start-up of the photographic printer 10.

When a power switch (SW) of the photographic printer 10 is switched on (Step S1), initial values of the rotation positions of the polarizing beam splitter (PBS), at which the transmittance of the laser beams becomes, for example, 100%, are read out from the position memories 121R, 121G and 121B. After that, the polarizing beam splitter drivers 107R, 107G and 107B respectively rotate the polarizing beam splitters 110R, 110G and 110B to the initial positions corresponding to the initial values (Step S3). Subsequently, the initial values of the optical modulation data are read out from any one of the lookup tables 102A, 102B, 102C . . . corresponding to the combinations of the kinds of the photographic paper and the developer used in the photographic printer 10 by the memory renewer 125 (Step S5).

When the photographic printer 10 is initialized, the sample image data of gray is inputted by a scanner (Step S7). The laser light sources 104R, 104G and 104B start to oscillate the laser beams of red, green and blue (Step S9). The laser beams emitted from the laser light sources 104R, 104G and 104B are modulated by the acousto-optic modulators (AOM) 106R, 106G and 106B (Step S11). The intensities of the laser beams passing through the acousto-optic modulators 106R, 106G and 106B are further attenuated by the polarizing beam splitters 110R, 110G and 110B (Step S13). The sensitized surface of the photographic paper is exposed by the laser beams passing through the (Step S15).

When a part of the photographic paper is exposed, the position switcher 124 judges whether the rotation positions of the polarizing beam splitters 110R, 110G and 110B are to be changed or not (Step S17). At this time, for example, only the fifth region shown in FIG. 7 is exposed, so that the position switcher 124 switches the rotation positions of the polarizing beam splitters 110R, 110G and 110B at positions where the transmittance of the laser beams becomes, for example, 75% (Step S19). The main controller 101 repeats the steps S9 to S19 until the transmittance of the laser beams becomes 0% by a predetermined ratio.

When the exposure of the photographic paper sheet 1A is completed, the photographic paper sheet 1A is conveyed to the developing unit 2 by the conveyor 5, and developed by the developing unit 2 (Step S21). As a result, the test print shown in FIG. 7 can be obtained.

Subsequently, when the operator loads the test print into the densitometer 22, the densities of the respective regions on the photographic paper sheet 1A are sensed by the densitometer 22 (Step S23). The judger 122 judges whether distribution of the densities of the test print is proper or not (Step S25). When it is judged that the proper distribution of the densities cannot be obtained, the memory renewer 125 renews the optical modulation data in the lookup table (Step S27). Subsequently, the main controller 101 returns to the step S9 and repeats the steps S9 to S25 for evaluating new test print exposed by using the renewed optical modulation data. In the step S27, it is preferable to limit the range of the variation of the rotation positions of the polarizing beam splitters 110R, 110G and 110B narrower for increasing the accuracy of the distribution of the gradation of the visual image formed on the photographic paper.

Alternatively, when it is judged that the proper distribution of the densities can be obtained, the optical modulation data in the lookup table at the time when the distribution of the densities is judged proper are finally memorized in the lookup table suitable for the combination of the photographic paper and the developer and to be used for actual photographic printing (Step S29). Simultaneously, the rotation positions of the polarizing beam splitters 110R, 110G and 110B, at which the portion having the darkest density in the test print judged proper distribution of the densities was exposed, are memorized in the position memories 121R, 121G and 121B as the standard positions of the polarizing beam splitters 110R, 110G and 110B in the photographic printing.

When plural kinds of the photographic papers are contained in the containers 20A and 20B, the main controller 101 repeats the steps S9 to S29 with respect to all kinds of the photographic papers (Step S31). When the optical modulation data memorized in the lookup tables and the standard rotation positions of the polarizing beam splitters 110R, 110G and 110B are obtained with respect to all the kinds of the photographic papers, the laser drivers 105R, 105G and 105*b* stop the oscillation of the laser beams (step S33) and the test printing operation is completed.

Figure 10:
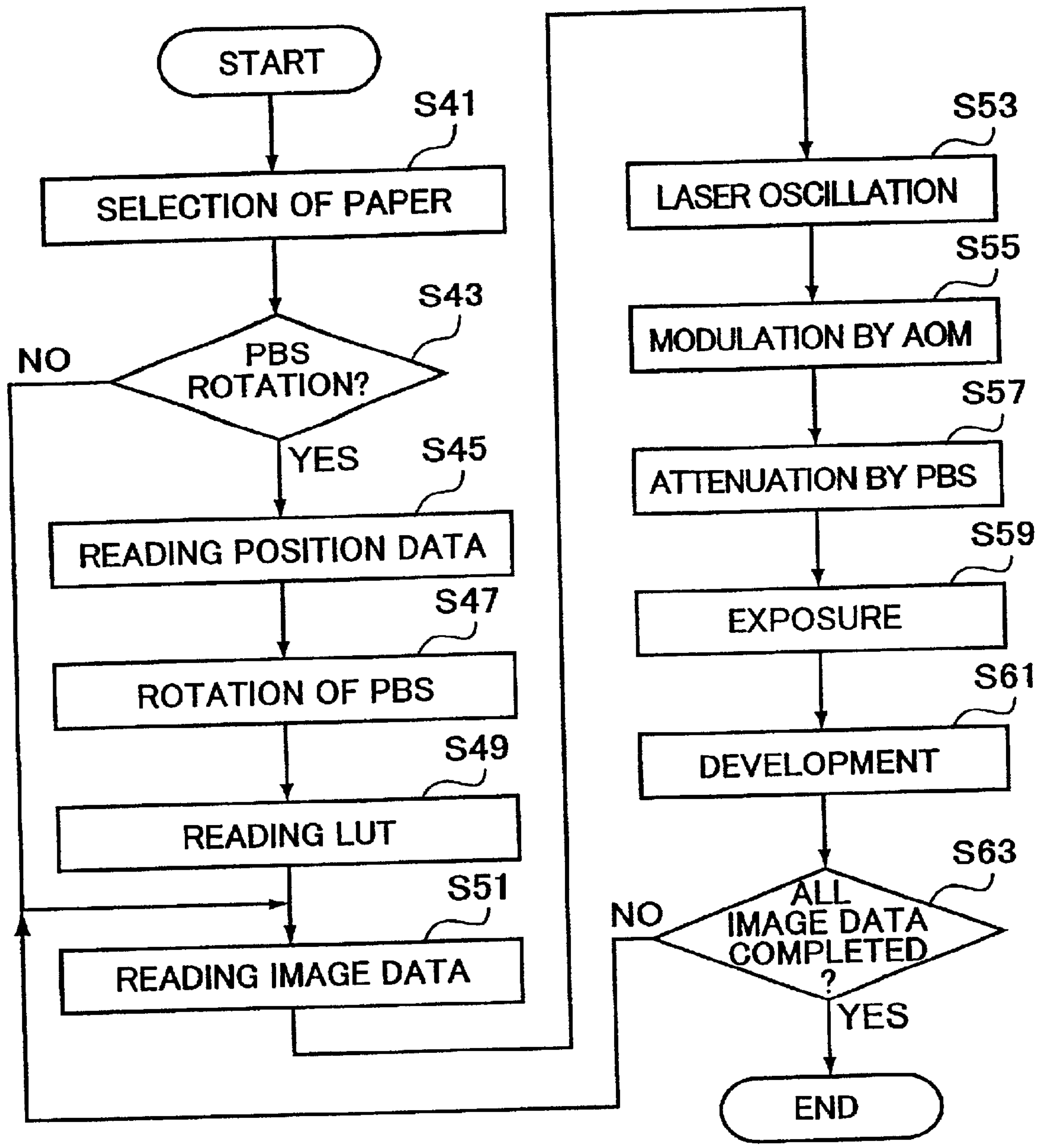
FIG. 10 is a flow chart for showing steps of actual photographic printing by the photographic printer in the first embodiment.

Subsequently, the actual photographic printing operation in the photographic printer 10 in the first embodiment is described with reference to a flowchart shown in FIG. 10.

When the operator inputs an order by using the I/O unit 140, the main controller 101 selects the kind of the photographic paper used in the order (Step S41). The position switcher 124 judges whether the rotation positions of the polarizing beam splitters 110R, 110G and 110B are necessary to change the rotation positions or not (Step S43). When it is judged to change the rotation positions of the polarizing beam splitters 110R, 110G and 110B, the position switcher 124 reads out the standard rotation positions of the polarizing beam splitters 110R, 110G and 110B corresponding to the kind of the photographic paper from the position memories 121R, 121G and 121B (Step S45). Subsequently, the polarizing beam splitter drivers 109R, 109G and 109B respectively rotate the positions of the polarizing beam splitters 110R, 110G and 110B to the standard rotation positions (Step S47). When the polarizing beam splitters 110R, 110G and 110B are positioned at the standard rotation positions, the main controller 101 reads out the optical modulation data corresponding to the kind of the photographic paper from the lookup table 102A, 102B, 102C . . . (Step S49). Alternatively, when it is judged not to change the rotation positions of the polarizing beam splitters 110R, 110G and 110B, the rotation positions of the polarizing beam splitters 110R, 110G and 110B and the optical modulation data at the time are corresponding to the kind of the photographic paper, so that the main controller 101 skips the steps S45 to S49.

Subsequently, the main controller 101 reads the image data including the components of red, green and blue (Step S51). Simultaneously, the laser light sources 104R, 104G and 104B start to oscillate the laser beams of red, green and blue (Step S53). The laser beams emitted from the laser light sources 104R, 104G and 104B are modulated by the acousto-optic modulators (AOM) 106R, 106G and 106B with using the image data and the optical modulation data (Step S55). That is, the driving signals of the acousto-optic modulators 106R, 106G and 106B are configured by the continuation of the values selected from the optical modulation data corresponding to the image data. The intensities of the laser beams passing through the acousto-optic modulators 106R, 106G and 106B are further attenuated by the polarizing beam splitters 110R, 110G and 110B so as to obtain the proper distribution of the densities not saturated (Step S57). The sensitized surface of the photographic paper sheet 1A is exposed by the laser beams passing through the polarizing beam splitters 110R. 110G and 110B (Step S59).

The exposed photographic paper sheet 1A is developed by the developing unit 2 (Step S61). The steps S51 to S61 are repeated with respect to all the image data included in the same order (step S63). When all the photographic prints corresponding to all the image data in the same order are obtained, the main controller completes the photographic printing operation with respect to the order, and stands by the next order.

As mentioned above, the intensities of the laser beams passing through the acousto-optic modulators 106R, 106G and 106B modulated are adjusted by using the compensated optical modulation data memorized in the lookup table so as to correspond to the actual intensity of the photographic paper, so that the photographic print obtained by the photographic printer in accordance with the second invention can be formed for reproducing the proper gradation with respect to the original image data. As a result, the quality of the photographic print can be increased.

In the above-mentioned first embodiment, the polarizing beam splitters 110R, 110G and 110B are provided at downstream positions with respect to the acousto-optic modulators 106R, 106G and 106B. The positions of the polarizing beam splitters 110R, 110G and 110B are not restricted by the illustration or the description. It is possible to dispose the polarizing beam splitters 110R, 110G and 110B at any positions on the optical paths between the laser light sources 104R, 104G and 104B and the polygon mirror 118.

Second Embodiment

A second embodiment of the present invention is described. The configuration of the photographic printer in the second embodiment is substantially the same as that in the first embodiment shown in FIG. 1. Furthermore, the elements designated by the same numerals as those in the first embodiment are substantially the same. Thus, the explanations of them are omitted in the following description.

Figure 11:
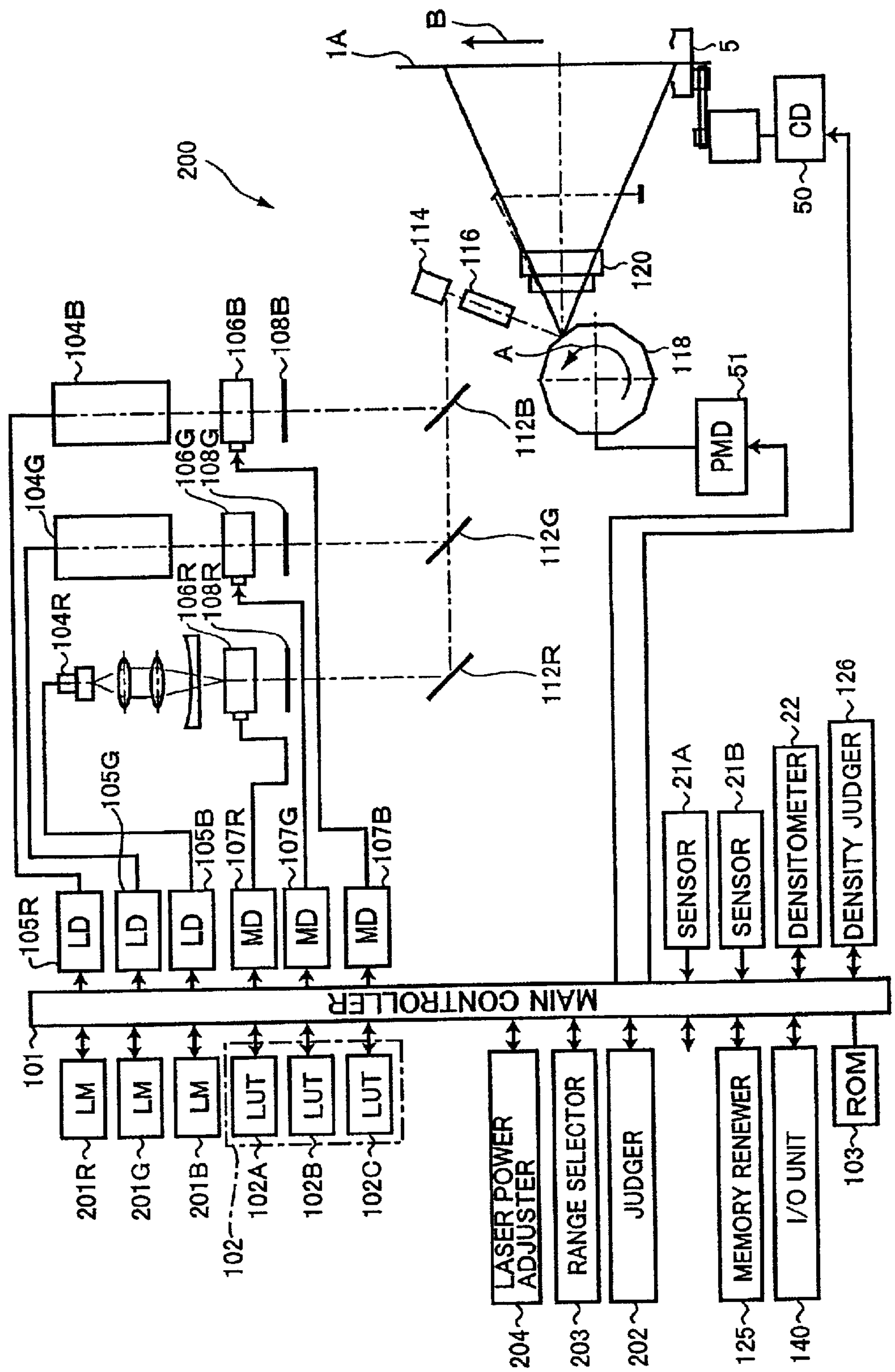
FIG. 11 is a block diagram for showing a configuration of a laser scanning unit of the photographic printer in a second embodiment.

FIG. 11 shows a block diagram of the laser scanning unit 200 in the second embodiment. In comparison with FIGS. 11 and 2, the laser scanning unit 200 in the second embodiment has no polarizing beam splitter used as the adjuster of the intensities of the laser beams.

The laser light sources 104R, 104G and 104B has output adjusting function by which the intensities of the laser beams emitted from them can be adjusted in a range about ±10% with respect to the standard levels of the intensities of the laser beams. As mentioned above, the intensities of the laser beams used for exposing the photographic paper is adjusted corresponding to the variation of sensitivity of a combination of the kinds of the photographic paper and the developer. In the second embodiment, the intensities of the laser beams emitted from the laser light sources 104R, 104G and 104B are adjusted corresponding to the variation of the sensitivity of the photographic paper.

Three laser power memories 201R, 201G and 201B are connected to the main controller 101 for memorizing control data for controlling the laser light sources 104R, 104G and 104B so as to output the laser beams having proper intensities corresponding to the actual sensitivity of the photographic paper.

A judger 202, a range selector 203 and a laser power switcher 204 are further connected to the main controller 101. The judger 202 judges whether the combination of the photographic paper and the developer is changed from the initial combination of them or the combination in the last test printing or not. The range selector 203 selects a range in which the intensities of the laser beams can be controlled. For example when the range is selected between 50% to 100% by the range selector 203, the intensities of the laser beams emitted from the laser light sources 104R, 104G and 104B can be controlled between 50% to 100% with respect to the highest intensities of the laser light beams. The position switcher switches the control signals of the laser light sources 104R, 104G and 104B for varying the intensities of the laser beams emitted from them corresponding to the variation of the sensitivity of the photographic paper.

Figure 12:
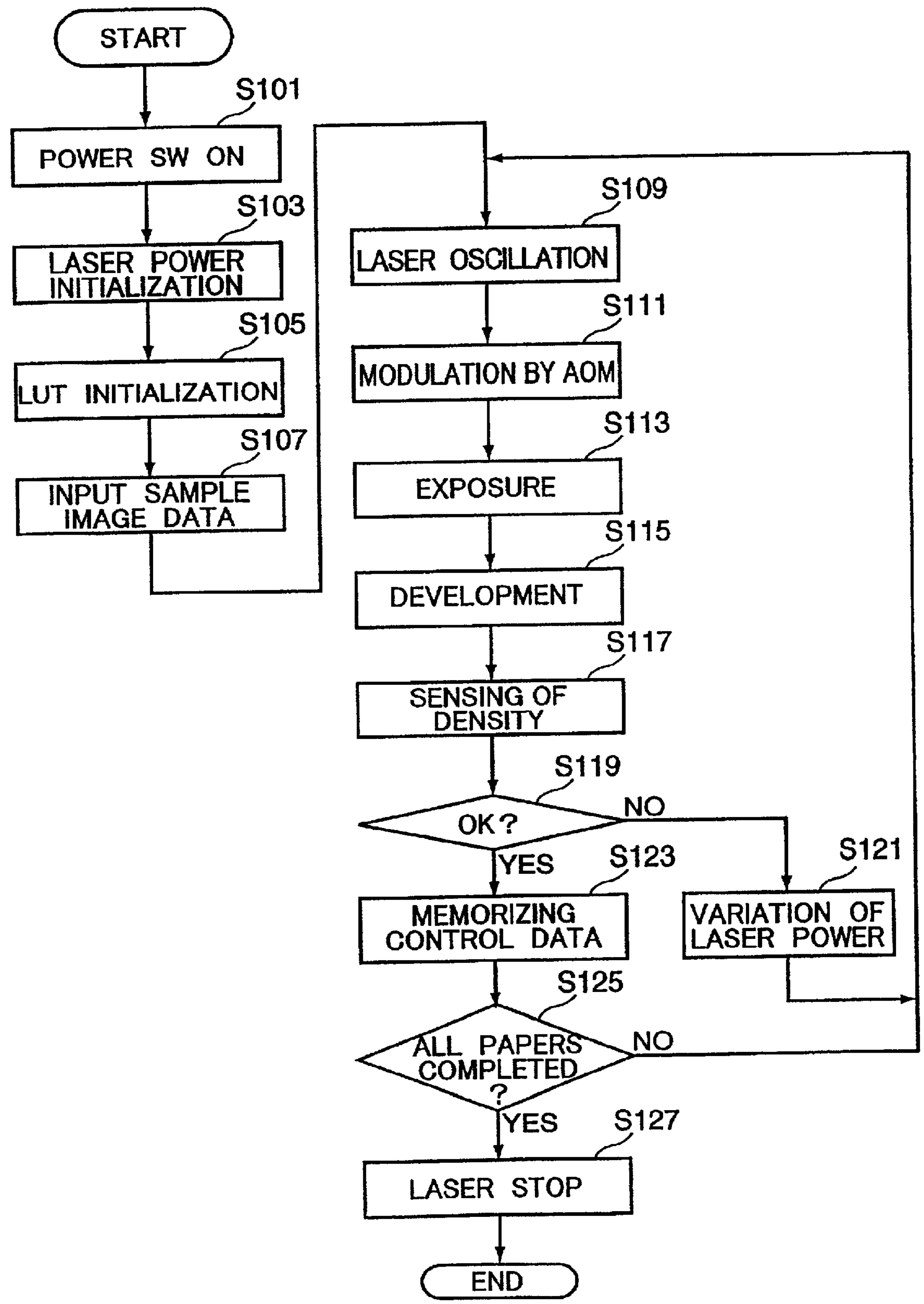
FIG. 12 is a flowchart for showing steps of test printing operation by the photographic printer in the second embodiment.

Subsequently, the test printing operation in the photographic printer 10 in the second embodiment is described with reference to a flowchart shown in FIG. 12.

When a power switch (SW) of the photographic printer 10 is switched on (Step S101), initial values of the control data of the laser light sources 104R, 104G and 104B are read out from the laser power memories 201R, 201G and 201B (Step S103). Subsequently, the initial values of the optical modulation data are read out from any one of the lookup tables 102A, 102B, 102C . . . corresponding to the combinations of the kinds of the photographic paper and the developer used in the photographic printer 10 by the memory renewer 125 (Step S105).

When the photographic printer 10 is initialized, the sample image data of gray is inputted by a scanner (Step S107). The laser light sources 104R, 104G and 104B start to oscillate the laser beams of red, green and blue (Step S109). The laser beams emitted from the laser light sources 104R, 104G and 104B are modulated by the acousto-optic modulators (AOM) 106R, 106G and 106B (Step S111). The sensitized surface of the photographic paper is exposed by the laser beams passing through the (Step S113).

When the exposure of the photographic paper sheet 1A is completed, the photographic paper sheet 1A is conveyed to the developing unit 2 by the conveyor 5, and developed by the developing unit 2 (Step S115).

Subsequently, when the operator loads the test print into the densitometer 22, the densities of the respective regions on the photographic paper sheet 1A are sensed by the densitometer 22 (Step S117). The judger 122 judges whether distribution of the densities of the test print is proper or not (Step S119). When it is judged that the proper distribution of the densities cannot be obtained, the laser power switcher 204 changes the control data of the laser light sources 104R, 104G and 104B for varying the intensities of the laser beams (Step S121). Subsequently, the main controller 101 returns to the step S109 and repeats the steps S109 to S119 for evaluating new test print exposed by using the renewed optical modulation data.

Alternatively, when it is judged that the proper distribution of the densities can be obtained, the control data of the laser light sources 104R, 104G and 104B at the time when the distribution of the densities is judged proper are finally memorized in the laser power memories 201R, 201G and 201B suitable for the combination of the photographic paper and the developer and to be used for actual photographic printing (Step S123).

When plural kinds of the photographic papers are contained in the containers 20A and 20B, the main controller 101 repeats the steps S109 to S123 with respect to all kinds of the photographic papers (Step S125). When the control data of the laser light sources 104R, 104G and 104B are obtained with respect to all the kinds of the photographic papers, the laser drivers 105R, 105G and 105*b* stop the oscillation of the laser beams (step S127) and the test printing operation is completed.

Figure 13:
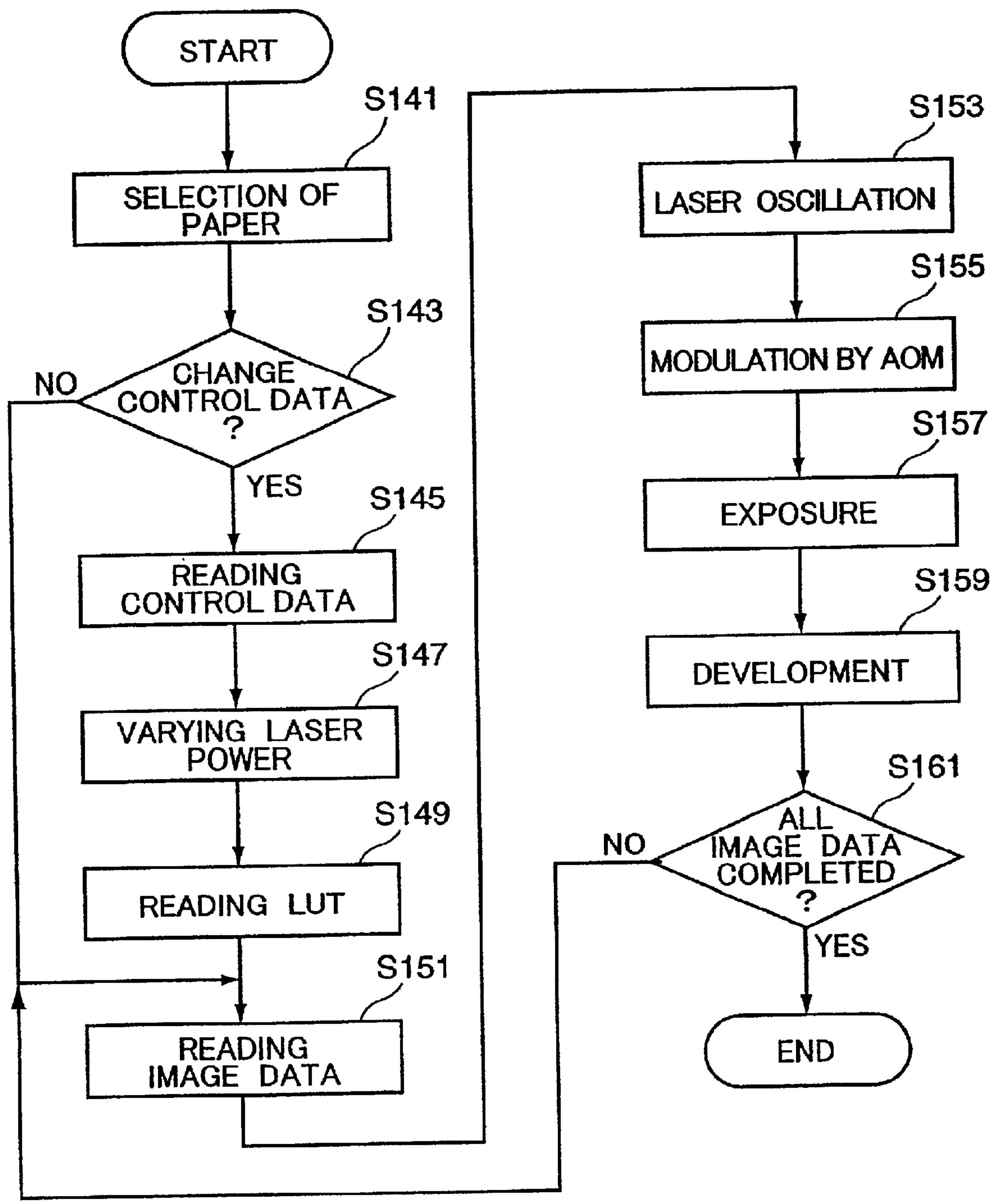
FIG. 13 is a flow chart for showing steps of actual photographic printing by the photographic printer in the second embodiment.
Figure 14:
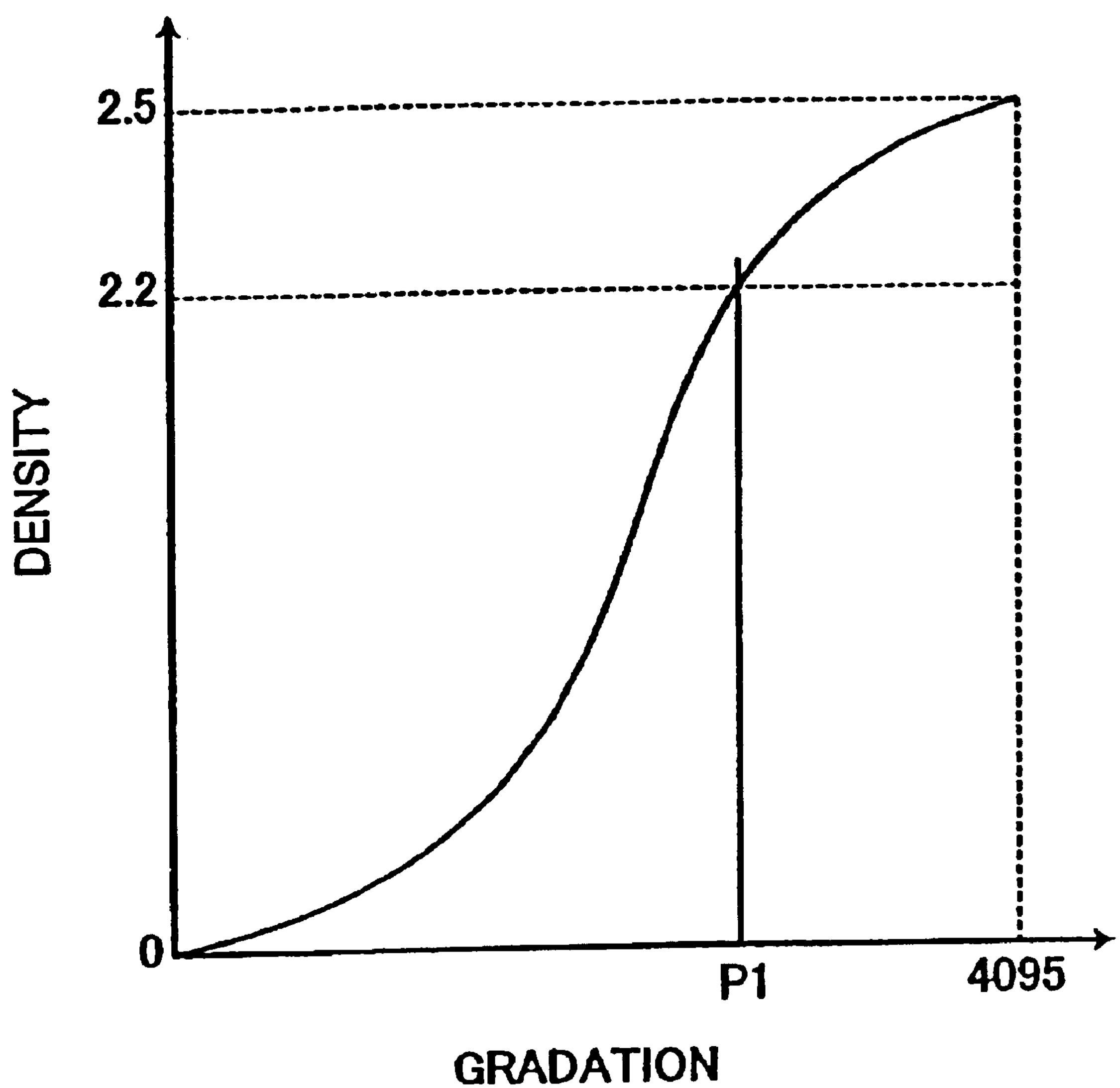
FIG. 14 is a graph for showing examples of γ-characteristic curves of a photographic paper.

Subsequently, the actual photographic printing operation in the photographic printer 10 in the second embodiment is described with reference to a flowchart shown in FIG. 13.

When the operator inputs an order by using the I/O unit 140, the main controller 101 selects the kind of the photographic paper used in the order (Step S141). The laser power switcher 204 judges whether it is necessary to change the control, data of the laser power sources 104R, 104G and 104B or not (step S143). When it is judged to change the control data of the laser power sources 104R, 1040 and 104B, the laser power switcher 204 reads out the new control data of the laser power sources 104R, 104G and 104B corresponding to the kind of the photographic paper from the laser power memories 201R, 201G and 201B (Step S145). Subsequently, the laser drives (LD) 105R, 105G and 105B respectively vary the intensities of the laser beams (laser power) emitted from the laser light sources 104R, 104G and 104B (Step S147). When the intensities of the laser beams emitted from the laser light sources 104R, 1040 and 104B are varied, the main controller 101 reads out the optical modulation data corresponding to the kind of the photographic paper from the lookup table 102A, 1022, 102C . . . Step S149). Alternatively, when it is judged not to change the control data of the laser power sources 104R, 1040 and 104B, the intensities of the laser beams emitted from the laser light sources 104R, 104G and 104B driven by the control data at the time are corresponding to the kind of the photographic paper, so that the main controller 101 skips the steps S145 to S149.

Subsequently, the main controller 101 reads the image date including the components of red, green and blue (Step S151). Simultaneously, the laser light sources 104R, 104G and 104B start to oscillate the laser beams of red, green and blue (Step S153). The laser beams emitted from the laser light sources 104R, 104G and 104B are modulated by the acousto-optic modulators (AOM) 106R, 106G and 106B with using the image data and the optical modulation data (Step S155). The sensitized surface of the photographic paper sheet 1A is exposed by the laser beams (Step S157). The exposed photographic paper sheet 1A is developed by the developing unit 2 (Step S159). The steps S151 to S159 are repeated with respect to all the image data included in the same order (Step S161). When all the photographic prints corresponding to all the image data in the same order are obtained, the main controller completes the photographic printing operation with respect to the order, and stands by the next order.

As mentioned above, the intensities of the laser beams emitted from laser light sources 104R, 105G and 104B are adjusted so as to correspond to the actual intensity of the photographic paper, so that the photographic print obtained by the photographic printer in accordance with the second invention can be formed for reproducing the proper gradation with respect to the original image data. As a result, the quality of the photographic print can be increased.

Other Modification

In the above-mentioned embodiments, the laser scanning unit 100 or 200 is used as the exposing apparatus of the photographic printer. It, however, is possible to use the laser scanning unit 100 or 200 in another image forming apparatus such as a laser beam printer or a document copier.

Furthermore, three laser beams of red, green and blue are superimposed before the polygon mirror 118 in the above-mentioned embodiments. It, however, is possible to introduce three laser beams independently to the polygon mirror 118 respectively along different optical paths.

Still furthermore, the acousto-optic modulators 106R, 106G and 106B are used as the modulators for modulating the intensities of the laser beams passing therethrough. It, however, is possible to use other modulators such as electro-optic modulators or magneto-optical modulators.

This application is based on patent applications 2000-151142 and 2000-151143 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A photographic printer comprising:

a plurality of containers, each of the containers including a photographic paper of a specific sensitivity, the photographic paper in the containers being selectively used in the printer;

a plurality of sensitivity detectors respectively associated with the containers to detect the specific sensitivity of the photographic paper in the container;

at least one laser light source for emitting a laser beam having a predetermined wavelength;

a laser light controller for controlling the laser beam emitted from the laser light source such that the emitted light is at a predetermined intensity level;

an optical modulator for modulating an intensity of the laser beam according to optical modulation data corresponding to image data;

a scanning mechanism for exposing a sensitized surface of the photographic paper by the laser beam while the laser beam is scanning the, photographic paper to form a latent image on the photographic paper;

a beam adjuster including means for adjusting the intensity of the laser beam so that an intensity range of the scanning laser beam corresponds to the selected photographic paper; wherein each of the containers has a data bearing section which bears data of the photographic paper contained therein including the specific sensitivity of the photographic paper, and wherein each of the sensitivity detectors has a reader for reading the data in the data bearing section and the beam adjuster adjusts the intensity of the laser beam in accordance with the sensitivity of the selected photographic paper detected by the sensitivity detector, and wherein each of the data bearing sections includes a plurality of transparent and light shielding portions representing the data in digital form, and the reader includes a plurality of photo-interrupters for detecting at least one of the transparent and light shielding portions.

2. A photographic printer comprising:

a plurality of containers, each of the containers including a photographic paper of a specific sensitivity, the photographic paper in the containers being selectively used in the printer;

a plurality of sensitivity detectors respectively associated with the containers to detect the specific sensitivity of the photographic paper in the container;

at least one laser light source for emitting a laser beam having a predetermined wavelength;

a laser light controller for controlling the laser beam emitted from the laser light source such that the emitted light is at a predetermined intensity level;

an optical modulator for modulating an intensity of the laser beam according to optical modulation data corresponding to image data, a scanning mechanism for exposing a sensitized surface of the photographic paper by the laser beam while the laser beam is scanning the photographic paper to form a latent image on the photographic paper;

a beam adjuster including means for adjusting the intensity of the laser beam so that an intensity range of the scanning laser beam corresponds to the selected photographic paper;

a polarizing beam splitter having a polarizing film, the beam splitter being rotatable to rotate the polarizing film around an axis perpendicular to the optical path of the scanning mechanism, wherein a test printing operation is carried out with a rotational position of the beam splitter being changed, and a laser beam setter includes a memory for memorizing the rotational position of the beam splitter that provides an appropriate density of a test printed image, and a beam splitter adjuster for adjusting the rotational position of the beam splitter according to a memorized rotational position.

3. A photographic printer according to claim 2, further comprising a controller including means for controlling the photographic printer to carry out the test printing operation, and for changing an intensity level of the laser beam to be projected on the photographic paper; a measurement device for measuring the density of an image printed on the photographic paper with different intensity levels of the laser beam, and the laser beam setter for setting the intensity of the laser beam according to an evaluation of the printed paper by the measurement device.

4. A photographic printer comprising:

at least one laser light source for emitting a laser beam having a predetermined wavelength;

a laser light controller for controlling the laser beam emitted from the lager light source such that the emitted light is at a predetermined intensity level;

an optical modulator for modulating an intensity of the laser beam according to optical modulation data corresponding to image data;

a scanning mechanism for exposing a sensitized surface of a photographic paper by the laser beam while the laser beam is scanning the photographic paper to form a latent image on the photographic paper;

a beam adjuster for adjusting the intensity of the laser beam according to a sensitivity of a selected photographic paper;

a controller including means for controlling the photographic printer to carry out a test printing operation and for changing an intensity level of the laser beam projected on the photographic paper;

a measurement device for measuring the density of an image test-printed on the photographic paper with different intensities of the laser beam; and a laser beam setter for setting the intensity level of the laser beam according to an evaluation of the printed paper by the measurement device;

a polarizing beam splitter having a polarizing film, the beam splitter being rotatable to rotate the polarizing film around an axis perpendicular to the optical path of the scanning mechanism, wherein the test printing operation is carried out with a rotational position of the beam splitter being incrementally changed, and the laser beam better includes a memory for memorizing the rotational position of the beam splitter that provides an appropriate density of the image test-printed on the photographic paper, and a beam splitter adjuster for adjusting the rotational position of the beam splitter according to a memorized rotational position.

5. A photographic printer comprising:

a plurality of containers, each of the containers including a photographic paper of a specific sensitivity, the photographic paper in the containers being selectively used in the printer;

a plurality of sensitivity detectors respectively associated with the containers to detect the specific sensitivity of the photographic paper in the container, each of said of sensitivity detectors including an array of light emitting elements and photo sensing elements, said sensitivity detectors also including a board having at least one opening and means for interrupting light emitted from said light emitting elements, wherein said board is partially disposed between the light emitting elements and said photo sensing elements;

at least one laser light source for emitting a laser beam having a predetermined wavelength;

a laser light controller for controlling the laser beam emitted from the laser light source such that the emitted light is at a predetermined intensity level;

an optical modulator for modulating an intensity of the laser beam according to optical modulation data corresponding to image data;

a scanning mechanism for exposing a sensitized surface of the photographic paper by the laser beam while the laser beam is scanning the photographic paper to form a latent image on the photographic paper; and a beam adjuster located before the scanning mechanism for adjusting the intensity of the laser beam so that an intensity range of the scanning laser beam corresponds to the selected photographic paper.

* * * * *